Nov. 30, 1965
W. KOBER
3,221,193
DYNAMO SUPPORTING STRUCTURE
Filed Dec. 1, 1961
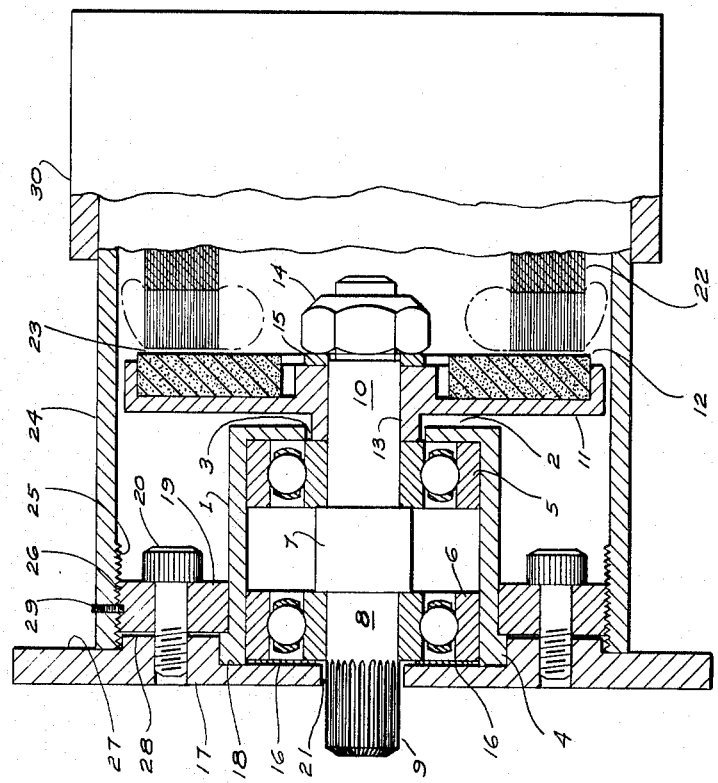
INVENTOR.
WILLIAM KOBER
BY
Christel & Bean
ATTORNEYS

United States Patent Office 3,221,193
Patented Nov. 30, 1965

3,221,193
DYNAMO SUPPORTING STRUCTURE
William Kober, Fairport, N.Y., assignor, by mesne assignments, to The Garrett Corporation, Los Angeles, Calif., a corporation of California
Filed Dec. 1, 1961, Ser. No. 156,455
3 Claims. (Cl. 310—90)

This invention relates generally to the dynamoelectric art, and more specifically to a new and useful supporting structure for generators and motors.

Dynamoelectric machines of radial or cylindrical air gap construction are characterized by the provision of a supporting housing which encircles and encloses the stator and rotor. Such enclosing housing is of critical importance in machines of this type, because it provides the support for the stator which must be maintained in accurately spaced relation to the rotor completely around the peripheral working face thereof.

However, in machines having a disc or axial air gap, such design considerations do not apply because the stator working face lies in a plane parallel to the rotor working face. In such axial air gap constructions, the essential consideration is the bearing support for the rotor shaft.

Accordingly, the primary object of my invention is to provide a rotor supporting structure of extreme simplicity, comprising substantially only a rotor shaft journalled in spaced bearings carried within a holder member as a self-contained unit which is readily assembled and attached to a mounting support.

Another object of my invention is to provide a rotor supporting structure as aforesaid having a uniform rate of expansion and contraction throughout.

Still another object of my invention is to provide a dynamo supporting structure having simple and easily operable means for mounting both a rotor shaft-bearing holder subassembly and an enclosing housing on a common supporting end member.

Still another object of my invention is to provide a dynamoelectric machine of axial air gap construction having a rotor shaft and bearing holder subassembly readily assembled into a self-contained unit, and wherein the rotor shaft-bearing holder unit and an enclosing housing carrying the stator are readily assembled on a common mounting into a complete unit, thereby providing a simple and economical construction and facilitating assembly thereof.

In one aspect thereof, a dynamoelectric machine constructed in accordance with my invention is characterized by the provision of a bearing holder comprising a tubular member having an internal shoulder adjacent one end, a first bearing carried within the tubular member adjacent the one end thereof, and a second bearing carried within the tubular member adjacent the opposite end thereof, a rotor shaft journalled in the bearings and having an extension beyond the tubular member, a rotor body carried by the shaft extension, a supporting end member, and means mounting the opposite end of the tubular member against the end member for being supported thereby, the rotor shaft having a shouldered portion between the bearings and maintaining the same spaced apart axially of the shaft, the first bearing being confined between the internal shoulder on the tubular member and the shouldered shaft portion, and the second bearing being confined between the shouldered shaft portion and the supporting end member.

In another aspect thereof, a dynamoelectric machine constructed in accordance with my invention is characterized by the provision of a bearing holder comprising a tubular member having an external shoulder adjacent one end, a rotor shaft journalled in the tubular member and having an extension therebeyond, a rotor body carried by the shaft extension, a housing encircling the rotor body, a supporting end member, and means mounting both the tubular member and the housing on the end member for being supported thereby, the mounting means including a clamping member carried by the end member, the clamping member engaging the external shoulder of the tubular member and thereby holding the latter against the end member, the clamping member also engaging the housing in a manner securing the same to the end member.

The foregoing and other objects, advantages and characterizing features of a dynamo supporting structure constructed in accordance with my invention will become clearly apparent from the ensuing detailed description taken in conjunction with the accompanying drawing wherein the single figure is a longitudinal, sectional view through an illustrative embodiment of my invention, certain parts being shown in elevation for simplicity and convenience of illustration.

Referring now in detail to the particular embodiment of my invention which is depicted in the accompanying drawing, and which is disclosed herein by way of illustration only and without thought of limitation, there is provided a bearing holder 1 of tubular construction. Member 1 comprises a bearing cup, having at its inner end an inturned flange or end wall 2, which is centrally apertured at 3. At its opposite end, bearing holder 1 is provided with an external annular flange 4.

Bearing holder 1 contains a first bearing 5, which fits against the inner end wall 2. A second bearing 6 is carried within holder 1 adjacent its open, outer end, and is maintained in spaced relation to bearing 5 by the enlarged, shouldered portion 7 of a rotor shaft 8 which is journalled in holder 1 by the bearings 5 and 6.

Shaft 8 has a splined extension 9 beyond the outer end of holder 1, for attachment to a drive, not shown. Shaft 8 has a part 10 extending through the end wall opening 3 and carrying a rotor body, generally designated 11. Rotor body 11 carries an annular, ceramic magnet 12, and has a hub 13 fitted on the shaft extension 10 and held against the inner race of bearing 5 by a nut 14 threaded on the end of shaft 8 and bearing against a washer 15. Other rotor body and magnet constructions can be used.

There are a number of ways to assemble the bearing system, but the preferred one is as follows:

Mount bearings 5 and 6 on shaft 8, preferably by a moderate press into position. The bearings may also be warmed and pushed in place, cooling to a firm fit on the shaft. The shaft and affixed bearings are then inserted into bearing holder 1 with its shaft end 10 extending through opening 3. Shims 16 are now added until the bearing holder is filled to the level of its open, outer end.

Then, bearing holder 1 is fitted against a supporting end member, which can be in the form of an end bell 17 and which preferably has a cylindrical recess 18 receiving the outer end of holder 1 in closely fitting relation thereto. A fastening member, in the form of a clamping ring 19, is secured to end member 17 as by bolts 20. Clamping ring 19 engages against the external shoulder 4 of holder 1, and thereby draws holder 1 into recess 18, and against end member 17, as the bolts 20 are tightened.

The splined end 9 of shaft 8 extends through an opening 21 in end member 17, and rotor body 11 is readily assembled on the end 10 of shaft 8.

Therefore, it is seen that the rotor shaft-bearing holder subassembly is readily assembled, and comprises a completely self-contained unit. Holder 1 can contain grease, or other lubricant desired for the bearings. This subassembly is readily attached to the supporting end member 17, through clamping ring 19 which locks holder 1 in place against the end member. The cylindrical recess 18 in the end member 17 closely surrounds shoulder 4, thereby helping to center the holder member 1 and maintain the same against lateral displacement.

The stator, generally indicated at 22, has its working face lying in a plane parallel to the working face of the annular magnet 12, and spaced therefrom to define an axial air gap 23. The stator is mounted within a housing 24 in any desired manner, not illustrated, preferably by means which are adjustable to bring the stator into parallelism with the rotor, examples of such means being shown in FIGS. 1–4 of my Patent 2,784,332, dated March 5, 1957.

Housing 24 encircles the rotor, and has a threaded end 25 which threads onto the periphery 26 of clamping ring 19 which is threaded to receive the same. Housing 24 is quickly assembled thereby to the supporting end member 17, by simply threading the housing on clamping ring 19 after the latter has been tightened in place. Housing 24 is threaded against the portion 27 of end member 17, in closely fitting relation around an annular boss 28 on said end member. A set screw 29 is carried by the housing 24, to engage ring 19 and thereby releasably lock housing in position.

The stator is carried by housing 24, and thereby mounted on member 17. Cylindrical sleeve 30 also can be carried by housing 24, to surround and protect whatever fastenings, not shown, are used to secure the stator in place.

Accordingly, it is seen that my invention fully accomplishes its intended objects. There is provided a rotor shaft-bearing holder assembly comprising a completely self-contained unit, which is locked in position on the supporting end member by means also locking the stator carrying housing in place. The rotor shaft-bearing unit can be extremely light in weight, and has the added advantage that holder 1, bearings 5 and 6, and rotor shaft 8 all can be of the same material, and will have a uniform rate of expansion and contraction. The entire structure is symmetrical about the axis of shaft 8.

While I have disclosed in detail only one embodiment of my invention, that has been done by way of illustration only and without thought of limitation. Such modifications and variations as naturally will occur to those skilled in the art are intended to be included within the scope of the appended claims.

Having fully disclosed and completely described my invention, together with its mode of operation, what I claim as new is:

1. In a dynamoelectric machine, a bearing holder comprising a tubular member having an external shoulder adjacent one end thereof, a rotor shaft journalled in said tubular member and having a part extending beyond the opposite end thereof, a rotor body carried by said shaft part, a housing encircling said tubular member and said rotor body, a supporting end member having an annular boss, and means mounting said tubular member and said housing on said end member, said mounting means comprising a clamping ring encircling said tubular member adjacent said shoulder, and means mounting said clamping ring on said end member boss for drawing said one end of said tubular member against said end member, said clamping ring having a threaded periphery and said housing having an internally threaded end portion engaging said ring periphery for threading said housing onto said ring and against said end member, said one end of said tubular member closely fitting within said boss and said housing end portion closely fitting around said boss.

2. In a dynamoelectric machine, a bearing holder comprising a tubular member partially closed by an apertured end wall at one end thereof and open at the opposite end thereof, a first bearing carried within said tubular member against said end wall thereof, a second bearing carried within said tubular member adjacent said opposite end thereof, a rotor shaft journalled in said bearings and having a shouldered portion maintaining said bearings in axially spaced relation, said shaft having a rotor body carrying part extending through said end wall and beyond said one end of said tubular member, said shaft having a drive connection part extending beyond said opposite end of said tubular member, an annular external shoulder on said tubular member at said opposite end thereof, a supporting end member, a clamping ring engaging said external shoulder, said clamping ring having a threaded periphery, fastening means mounting said clamping ring on said end member, said fastening means being operable to move said clamping ring toward said end member and thereby clamp said opposite end of said tubular member against said end member, said bearings thereby being confined in said tubular member by said end wall and said end member and said shaft being held thereby against axial shifting, a rotor carried by said shaft part and having its working face lying in a plane parallel to the axis of said shaft, an enclosing housing, a stator carried by said housing and having its working face lying in a plane parallel to the working face of said rotor, said housing having an internally threaded end thredly engaging said clamping ring periphery for securing said housing to said end member.

3. In a dynamoelectric machine, a bearing holder comprising a tubular member having an external shoulder adjacent one end thereof, a rotor shaft journalled in said tubular member and having a part extending beyond the opposite end thereof, a rotor body carried by said shaft part, a housing encircling said rotor body, a supporting end member, and means mounting both said tubular member and said housing on said end member, said mounting means comprising a clamping member carried by said end member, said clamping member engaging said external shoulder and thereby holding said tubular member against said end member, said clamping member also engaging said housing in a manner securing the same to said end member, wherein said clamping member comprises an externally threaded ring, said housing having an internally threaded end portion engaging said ring and held thereby against said end member.

References Cited by the Examiner

UNITED STATES PATENTS

| | | | |
|---|---|---|---|
| 1,643,491 | 9/1927 | Green | 308—189 |
| 1,928,690 | 10/1933 | Hohnhorst | 308—189 |
| 2,203,525 | 6/1940 | Dupree | 308—189 X |
| 2,393,900 | 1/1946 | Guertin | 310—90 |
| 2,424,013 | 7/1947 | Belcher | 308—189 |
| 2,430,843 | 11/1947 | Colwell | 310—268 |

MILTON O. HIRSHFIELD, *Primary Examiner.*

DAVID X. SLINEY, *Examiner.*